Figure 1:
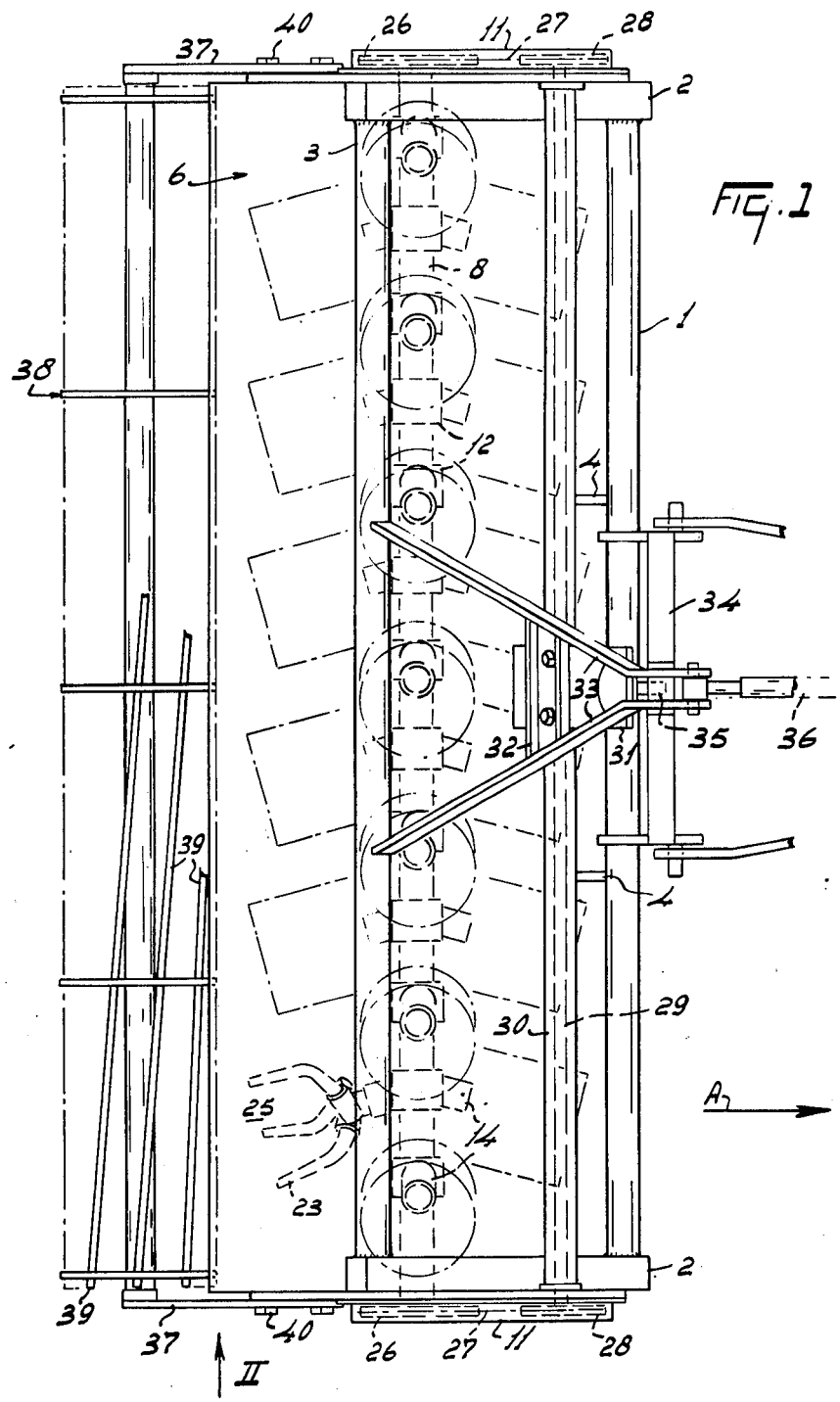

United States Patent [19]
van der Lely

[11] 4,026,364
[45] May 31, 1977

[54] SOIL CULTIVATING MACHINES

[76] Inventor: Cornelis van der Lely, 7, Bruschenmain, Zug, Switzerland

[22] Filed: Oct. 15, 1975

[21] Appl. No.: 622,465

[30] Foreign Application Priority Data

Oct. 15, 1974 Netherlands .................... 7413513

[52] U.S. Cl. .................... 172/68; 172/91; 172/119; 172/123; 172/545; 172/713
[51] Int. Cl.² .................. A01B 33/02; A01B 33/14
[58] Field of Search .................... 172/91–95, 172/68, 107–109, 118, 119, 122, 123, 59, 110, 111, 522–527, 545, 713

[56] References Cited

UNITED STATES PATENTS

| 2,004,154 | 6/1935 | Beatty ............................ | 172/91 X |
| 2,027,910 | 1/1936 | Herring .......................... | 172/91 X |
| 3,170,522 | 2/1965 | Vissers ........................... | 172/91 |
| 3,616,862 | 11/1971 | van der Lely ................. | 172/59 X |
| 3,774,688 | 11/1973 | van der Lely et al. ......... | 172/59 X |

FOREIGN PATENTS OR APPLICATIONS

| 69,803 | 11/1892 | Germany .......................... | 172/526 |
| 324,668 | 2/1935 | Italy .................................. | 172/94 |
| 545,002 | 6/1956 | Italy .................................. | 172/111 |
| 41,497 | 11/1912 | Sweden ............................. | 172/92 |

Primary Examiner—Paul E. Shapiro
Attorney, Agent, or Firm—Mason, Mason & Albright

[57] ABSTRACT

A cultivating machine has an elongated cultivating member that is rotatably mounted to turn about a horizontal axis that extends transverse to the direction of normal travel. A plurality of tined soil cultivating means is mounted on a support shaft of the member and that shaft defines the horizontal axis of rotation. Each cultivating means comprises a group of tines that is freely rotatable about a corresponding axis of rotation. The axes of rotation of the cultivating means nonperpendicularly intersect the shaft and are formed by stub shafts that are journalled on brackets fastened to the shaft. Upon rotation of the cultivating member about the shaft, the tines of successive cultivating means engage the ground and the cultivating means each rotate to work a broad path of soil. The group of tines extend at angles to the axis of rotation of each cultivating means and twos of the cultivating means are mounted in opposing pairs that are offset with respect to adjacent pairs. A trailing soil working roller is adjustably connected to the frame to vary the working depth of the tines.

20 Claims, 3 Drawing Figures

SOIL CULTIVATING MACHINES

This invention relates to soil cultivating machines or cultivators of the kind which comprise a cultivating member that is rotatable about a horizontal or substantially horizontal axis, the cultivating member being furnished with a plurality of soil cultivating means.

According to the invention, there is provided a soil cultivating machine or cultivator of the kind set forth, wherein at least one of the soil cultivating means is mounted on the cultivating member in a freely rotatable manner, the axis of rotation thereof being directed towards that of the cultivating member.

Figure 2:
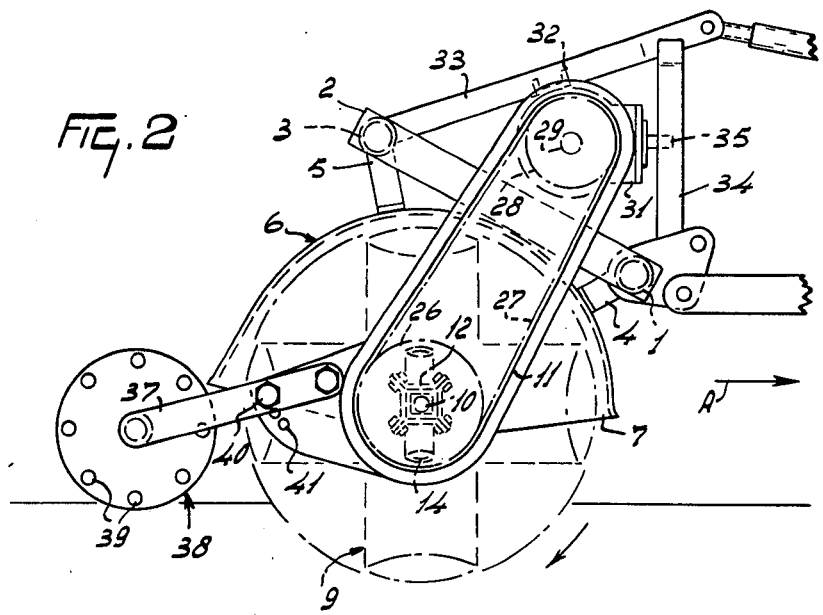
Figure 3:
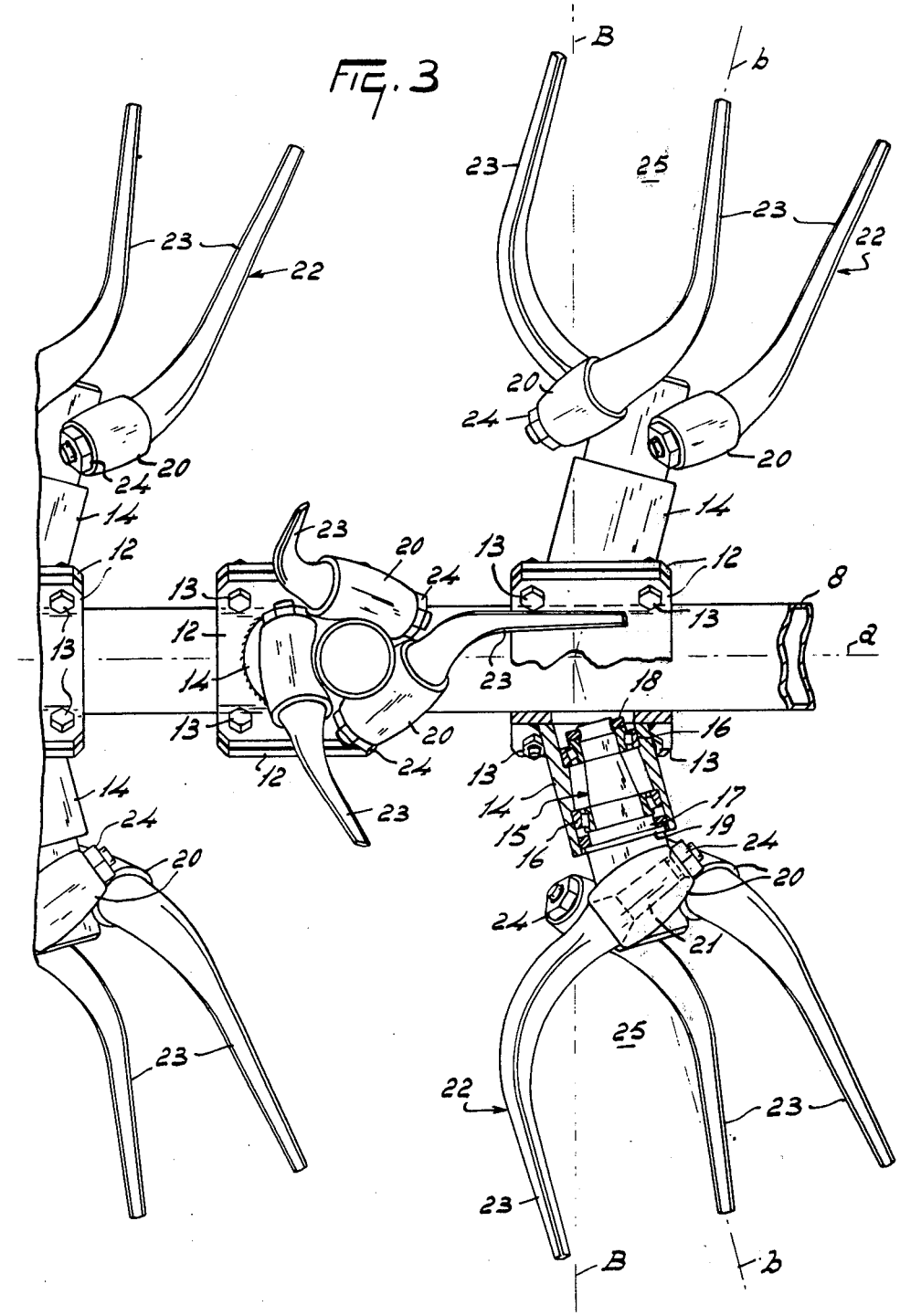

For a better understanding of the invention, and to show how the same may be carried into effect, reference will now be made, by way of example, to the accompanying drawings, in which:

FIG. 1 is a plan view of a soil cultivating machine or cultivator in accordance with the invention connected to the rear of an agricultural tractor, FIG. 2 is a side elevation as seen in the direction indicated by an arrow II in FIG. 1, and FIG. 3 is a part-sectional elevation, to an enlarged scale, illustrating the construction, arrangement and mounting of soil cultivating means of the cultivator in greater detail.

Referring to the drawings, the soil cultivating machine or cultivator that is illustrated therein will hereinafter be referred to, throughout the descriptive portion of the Specification, merely as a "cultivator", for the sake of brevity. The cultivator has a frame beam 1 of circular cross-section that extends substantially horizontally transverse, and normally substantially horizontally perpendicular, to the intended direction of operative travel of the cultivator which is indicated by an arrow A in FIGS. 1 and 2 of the drawings. The frame beam 1 is located at substantially the front of the cultivator with respect to the direction A and the leading ends of further beams 2 are secured to its opposite extremities in such a way that (see FIG. 2) said beams 2 are inclined upwardly and rearwardly with respect to the direction A from the frame beam 1. The rearmost and uppermost ends of the beams 2 are perpendicularly interconnected by a frame beam 3 of circular cross-section that extends parallel or substantially parallel to the frame beam 1 but at a higher horizontal level than the frame beam 1 and to the rear thereof with respect to the direction A. Supports 4 project downwardly and rearwardly from the frame beam 1 at equal distances from its midpoint and, similarly, supports 5 project downwardly, and forwardly to some extent, from the frame beam 3 at the same distance from the midpoint of that beam. The ends of the supports 4 and 5 that are remote from the beams 1 and 3 respectively are rigidly secured to the upper curved surface of a hood 6, the hood 6 being provided with substantially vertical side or end plates 7. Substantially horizontally aligned bearings are carried by the side or end plates of the hood 6 in such a position that they define an axis of rotation which intersects, or is very close to, the center of curvature of the major curved wall of the hood 6 which, as will be evident from FIG. 2 of the drawings, is principally of cylindrically curved formation. Stub shafts 10 at the opposite ends of a substantially horizontal support 8 are rotatably journalled in the bearings that are carried by the side or end plates 7, said stub shafts 10 projecting beyond the bearings into transmission casings 11 which are fastened to the beams 2 alongside the relatively remote surfaces of the two side or end plates 7 so as to extend upwardly, and forwardly with respect to the direction A, from bottom to top (see FIG. 2).

The support 8 is of a polygonal cross-section which it is preferred should be a square cross-section, as illustrated. The support 8 is a central part of a cultivating member that is generally indicated by the reference 9, said cultivating member 9 being rotatable about the longitudinal axis $a$ of the support 8. Assemblies of four substantially identical brackets 12 whose shapes can be seen in FIGS. 2 and 3 of the drawings are clamped to the support 8 at regular intervals along the length of the latter by employing bolts 13 which are entered through the abutting, and substantially radially disposed with respect to the axis $a$, pairs of the limbs of the brackets 12. The webs or bases of the four brackets 12 of each assembly engage around the four sides of the square cross-section support 8 and it will be seen from the drawings that the webs or bases of two diametrically opposed brackets 12 of each assembly are provided with corresponding sleeves 14 that project outwardly from between the limbs of the corresponding two brackets 12. The longitudinal axes $b$ of the sleeves 14 intersect the longitudinal axis $a$ of the support 8 and, at the points of intersection, are inclined at angles of substantially 15° to corresponding planes B which are perpendicular to the axis $a$. As will be evident from FIG. 3 of the drawings, the two brackets 12 of each assembly that carry the corresponding diametrically opposed sleeves 14 are spaced apart, around the axis $a$, by 90° from the similarly furnished brackets 12 of the or each neighbouring assembly along the row of such assemblies that is carried by the support 8. The longitudinal axes $b$ of the two sleeves 14 that form parts of each assembly are contained in corresponding imaginary conical surfaces whose apices are coincident with the longitudinal axis $a$ of the support 8. As seen in the plan view of FIG. 1 of the drawings, and with reference to the direction A, the two longitudinal axes $b$ of each pair all diverge to the right.

Each of the sleeves 14 rotatably supports a corresponding stub shaft 15 and it will be seen from FIG. 3 of the drawings that, inside each sleeve 14, the corresponding stub shaft 15 tapers towards its free end that is radially closest to the axis $a$. The longitudinal axis $b$ of each sleeve 14 is also the longitudinal axis and axis of rotation of the corresponding shaft 15. Opposed pairs of roller bearings 16 are arranged in spaced relationship inside each sleeve 14 and rotatably support the corresponding stub shaft 15 in that sleeve. The radially outer and larger roller bearing 16 of each pair is enclosed between a shoulder 17 on the corresponding stub shaft 15 and an internal shoulder of the corresponding sleeve 14. Each radially inner and smaller roller bearing 16 is enclosed between a nut 18 screwed onto an inner end portion of the stub shaft 15 concerned and a further internal shoulder of the corresponding sleeve 14. Each stub shaft 15 is provided, in substantially its thickest portion at the mouth of the corresponding sleeve 14, with a flange 19 which co-operates with a sealing ring around the corresponding shoulder 17 in effectively closing off the radially outermost end of the corresponding sleeve 14. Each stub shaft 15 projects outwardly beyond the mouth of the corresponding sleeve 14 and its outwardly projecting portion is provided with three holders 20 that are welded or otherwise rigidly secured to its outer surface at 120° intervals around the corresponding axis $b$. Each holder 20 is generally sleeve-shaped and has an internal bore whose longitudinal axis is non-perpendicularly inclined to the corresponding axis b in such a way as to appear to be tangential to a circle centered upon the axis b concerned when viewed lengthwise along that axis. When viewed in a direction that is perpendicular to a plane which contains the axis a and the axis b concerned (see the right-hand side of FIG. 3), the longitudinal axis of the internal bore of each holder 20 is non-perpendicularly inclined to the axis b at an acute angle whose sides diverge in a direction away from the axis a.

The internal bore of each holder 20 receives a fastening portion 21 of a corresponding rigid tine 22, the longitudinal axis of said fastening portion 21 being coincident with that of the bore concerned. Each tine 22 also has an operative portion 23 which is initially in alignment with the straight fastening portion 21 but which then extends through a bend into a substantially straight free end which is substantially, although not necessarily strictly, parallel to the corresponding axis b. From its junction with the corresponding operative portion 23, each tine fastening portion 21 comprises an initial frusto-conically tapering part which is followed by a much less steeply tapering part that terminates in a short screw-threaded part which is arranged to co-operate with a frusto-conically faced fastening nut 24. When the nut 24 is tightened, the fastening portion 21 of the tine 22 concerned is very firmly, but nevertheless releasably, secured in its co-operating holder 20. The operative portion 23 of each tine 22 tapers towards its free end or tip and the straight end part thereof has a cross-section which is best considered as being basically polygonal although it is not truely so. It is, in fact, preferred that the cross-section should be basically rectangular and, with this preferred cross-section, the operative portion 23 of each tine 22 is flattened toward its free end or tip in such a way that the ratio between two diagonals between the opposite corners of the cross-section progressively changes as the free end or tip is approached. The longer of each such diagonals extends substantially tangentially with respect to a circle centered upon the corresponding axis b. The what would otherwise be flat sides of the basically polygonal cross-section part of each tine operative portion 23 are formed with grooves that extend lengthwise along the part concerned from the free end or tip thereof. The straight end part of each tine operative portion 23 is inclined by a few degrees to a plane that contains the longitudinal axis of the fastening portion 21 of the same tine 22 and that is also parallel to the corresponding axis b. Each stub shaft 15 constitutes, together with the corresponding three tines 22 and their holders 20, a soil cultivating means that is generally indicated by the reference 25, said means 25 being freely rotatable relative to the common support 8 of the cultivating member 9 around the longitudinal axis b of the stub shaft 15 concerned, that axis b being inclined at an angle of substantially 15° to the corresponding plane B as shown in FIG. 3 of the drawings. Each plane B is perpendicular to the axis of rotation a of the support 8 and, as will be evident from FIG. 1 of the drawings, said axis a extends substantially horizontally transverse to the direction A and normally substantially horizontally perpendicular to that direction. The whole cultivating member 9 is, of course, arranged to rotate about the axis a.

The stub shafts 10 that project through the side or end plates 7 of the hood 6 are provided, inside the corresponding transmission casings 11, with sprocket wheels 26 and those sprocket wheels are in driven connection, by way of endless transmission chains 27, with smaller sprocket wheels carried at the opposite ends of a rotary shaft 29 that extends parallel to the support 8 between the interiors of the two transmission casings 11. Most of the length of the shaft 29 is located inside a tubular casing 30 which is provided midway along its length with a gear box 31. The top of the gear box 31 is bolted to the bottom of a bar 32 which interconnects two rearwardly divergent tie beams 33 that form parts of a coupling member or trestle 34 which is disposed midway across the width of the cultivator, at the front thereof with respect to the direction A, the base of the coupling member or trestle 34 being secured to the main frame beam 1 at locations which are close to the two supports 4. The coupling member or trestle 34 is constructed and arranged to enable the cultivator to be connected to the three-point lifting device or hitch of an agricultural tractor or other operating vehicle in a manner that is generally known per se and that is illustrated in outline in FIGS. 1 and 2 of the drawings. The tie beams 33 are divergent in a downward and rearward, with respect to the direction A, direction from the top of the coupling member or trestle 34 and their rearmost ends are secured to the frame beam 3 close to the corresponding supports 5. Meshing bevel pinions (not visible) inside the gear box 31 place the shaft 29 in driven connection with a substantially horizontal rotary input shaft 35 whose splined or otherwise keyed end projects forwardly in substantially the direction A from the front of the gear box 31. The rotary input shaft 35 is arranged to be placed in driven connection with the power take-off shaft of an agricultural tractor or other operating vehicle by way of an intermediate telescopic transmission shaft 36 (FIG. 1), which is of a construction that is known per se, having universal joints at its opposite ends.

Arms 37 are connected to the relatively remote surfaces of the two side or end plates 7 of the hood 6 so as to be turnable upwardly and downwardly, alongside those plates 7, about a substantially horizontal axis that is substantially parallel to the support 8 and that is defined by pivot bolts or the like. The pivot bolts or the like are located towards the rear of the plates 7 with respect to the direction A and the arms 37 extend rearwardly, and downwardly to some extent, from them. A soil working member in the form of an open ground roller 38 is rotatably supported between the rearmost ends of the two arms 37 so as to extend throughout the working width of the cultivating member 9, the axis of rotation of the roller 38 being substantially parallel to the frame beams 1 and 3 and to the support 8. The roller 38 is mounted in a freely rotatable manner and its soil-engaging periphery comprises a plurality, such as eight, of elongate elements 39 in the form of rods or tubes that extend in the same general direction as the axis of rotation but that are wound helically around that axis to some extent. The elements 39 are, of course, spaced apart from one another at regular angular intervals around the axis of rotation of the roller 38. Curved rear regions of the side or end plates 7 of the hood 6 are formed with rows of holes 41 that are equidistantly spaced from the substantially horizontal axis about which the arms 37 are pivotable. The arms 37 themselves are formed with single holes that can be brought into register with chosen ones of the holes 41 and locking bolts 40 are provided for entry through the holes in the arms 37 and the chosen holes 41 to maintain those arms 37, and thus the roller 38, at a corresponding angular setting about the axis that is defined by the above-mentioned pivot bolts or the like. The level of the axis of rotation of the roller 38 that is chosen relative to the level of the cultivating member 9 and other parts of the cultivator is a principal factor in determining the depth to which the soil cultivating means 25 can penetrate into the soil during the operation of the cultivator.

In the use of the cultivator that has been described, its coupling member or trestle 34 is connected to the three-point lifting device of an agricultural tractor or other operating vehicle and the rotary input shaft 35 of the gear box 31 is placed in driven connection with the power take-off shaft of the same tractor or other vehicle by employing the telescopic transmission shaft 36 that has universal joints at its opposite ends. The transmission between the shaft 35 and the support 8 is so arranged that the cultivating member 9 will rotate about the axis $a$ in the direction indicated by an arrow in FIG. 2 of the drawings which direction is such that the various soil cultivating means 25 will pass rearwardly through the soil relative to the direction A. The tines 22 of the successive soil cultivating means 25 are caused to engage the ground surface and, since the axis of rotation $b$ of each soil cultivating means 25 is non-perpendicularly inclined to the axis of rotation $a$ of the support 8, initial engagement will almost always take place at a point spaced from the corresponding axis $b$ with the result that the means 25 concerned will tend to revolve around that axis $b$. The provision of three tines 22 per soil cultivating means 25 ensures that more or less regular rotation will occur. The straight end parts of the operative portions 23 of the tines 22 are in trailing positions from top to bottom with respect to the directions of rotation of the soil cultivating means 25 that occur during the use of the cultivator and this tends to cause weeds, roots and other agricultural debris to be shed from the tines 22 as the work continues rather than adhering to the tines.

It will be evident from FIG. 1 of the drawings that the neighbouring pairs of soil cultivating means 25 work corresponding strips of land that at least adjoin, if not actually overlap, one another. Said strips of land may conveniently, but not essentially, have widths of substantially 30 centimeters. The soil cultivating means 25 are freely rotatable about the axes $b$ and are thus capable of engaging the soil in a manner which adjusts itself automatically to the nature and condition of that soil. This is in contradistinction to known cultivators whose soil cultivating means are fixed in position relative to a shaft or the like embodying a substantially horizontal axis equivalent to the axis $a$. With such known cultivators, the soil is worked in much the same manner regardless of the nature and condition thereof and, under some conditions, such as when the soil is wet and heavy, that soil is compressed to an excessive extent which is generally undesirable having regard to the result required. When using the cultivator that has been described and that is illustrated in the accompanying drawings, the soil tends to become broken up along natural lines of fracture and a substantially uniformly crumbled soil consistency results. Since the successively neighbouring pairs of soil cultivating means 25 along the support 8 are offset from one another by angles of 90° about the axis $a$ of that support, at least one row of the means 25 is nearly always in engagement with the soil during the use of the cultivator so that there is little, if any, jolting or "drag and snatch". The free rotatability of the various soil cultivating means 25 significantly reduces damage to the tines 22 as compared with cultivators that have fixed soil cultivating means as discussed above. The tines 22 can almost always turn angularly to avoid damage or breakage by any stones or the like which they may meet and any temporarly trapped stone or the like can be readily released. The soil cultivating means 25 are spaced apart from one another by quite large distances which are sufficient to ensure that any significant clogging of the cultivating member 9 rarely, if ever, occurs. In addition to performing its depth control function, the roller 38 that is disposed behind the cultivating member 9 with respect to the direction A rotates freely about its own longitudinal axis and subjects the broad strip of soil that has been worked by the member 9 to a subsequent treatment. Any unbroken lumps or clods of soil tend to be broken up by the roller 38 and the roller has a generally levelling effect upon the soil surface. It is noted that, due to the direction of rotation of the cultivating member 9 which is indicated by a small arrow in FIG. 2 of the drawings, the cultivator tends to assist its own propulsion in the direction A so that the tractive effort that must be exerted in that direction by the agricultural tractor or other operating vehicle is not as great as might at first appear to be required.

Although various features of the cultivator that has been described, and that is illustrated in the accompanying drawings, will be set forth in the following claims as inventive features, it is emphasised that the invention is not necessarily limited to those features and that it includes within its scope each of the parts of the cultivator that has been described, and/or that is illustrated in the accompanying drawings, both individually and in various combinations.

What I claim is:

1. A soil-cultivating machine comprising a frame and a cultivating member rotatably supported on said frame, driving means connected to said member to rotate same about a first axis during operation, a plurality of soil-working means being mounted on a substantially horizontal support shaft that defines said first axis and at least one of said soil-working means being freely turnable about a further axis, said further axis intersecting said first axis.

2. A machine as claimed in claim 1, wherein said further axis is non-perpendicularly inclined to a plane that is perpendicular to said first axis and is contained in an imaginary conical figure.

3. A machine as claimed in claim 2, wherein the central axis of the imaginary conical figure is substantially coincident with the first axis.

4. A machine as claimed in claim 1, wherein said soil-working means are mounted in pairs and the two soil-cultivating means of each pair are located substantially diametrically opposite to one another with respect to said first axis.

5. A machine as claimed in claim 4, wherein adjacent pairs of soil-working means along said support shaft are angularly offset relative to one another about that shaft by about 90°.

6. A machine as claimed in claim 1, wherein each soil-working means comprises a stub shaft journalled in a corresponding sleeve on a support shaft, the longitudinal axis of said support shaft-defining said first axis, said stub shaft being supported in said sleeve by two spaced apart bearings and said sleeve is fastened to a bracket that is clamped to said support shaft.

7. A machine as claimed in claim 6, wherein the support shaft is polygonal in cross-section and pairs of brackets that correspond to opposed soil-working means are clamped to the support shaft by further intermediate brackets.

8. A machine as claimed in claim 1, wherein the plurality of soil-working means are angularly offset from one another around said first axis of rotation of said cultivating member.

9. A machine as claimed in claim 8, wherein said soil-working means are mounted adjacent one another along said first axis and angularly offset thereabout by angles of not less than about 45°.

10. A machine as claimed in claim 1, wherein each freely turnable soil-working means includes at least one soil working tine.

11. A machine as claimed in claim 10, wherein each freely turnable soil-working means includes a group of three soil-working tines that are bent-over and extend away from said first axis of rotation in directions that are substantially parallel to said further axis of rotation of the corresponding soil-working means.

12. A machine as claimed in claim 11, wherein the three tines are spaced apart from one another at angular intervals of about 120° about the corresponding further axis of rotation.

13. A machine as claimed in claim 10, wherein the tine of each freely turnable soil-working means comprises an operative substantially straight portion that extends towards a free end and said portion is substantially parallel to said further axis of rotation of the corresponding soil-working means, said straight portion being inclined to a plane that contains the longitudinal axis of an upper fastening portion of that tine and said straight portion being parallel to said further axis of rotation.

14. A machine as claimed in claim 13, wherein the longitudinal axis of said fastening portion extends substantially tangentially with respect to a circle centered upon said further axis of rotation of the corresponding soil-working means.

15. A machine as claimed in claim 14, wherein said longitudinal axis of that fastening portion is non-perpendicularly inclined to the further axis of rotation of the corresponding freely turnable soil-working means.

16. A machine as claimed in claim 1, wherein a plurality of freely turnable soil-working means are mounted on said member and, as seen in plan, the corresponding further axes of rotation of said means are inclined away from said first axis of rotation of the cultivating member towards the same side of said machine.

17. A machine as claimed in claim 1, wherein a soil working roller is positioned behind said cultivating member with respect to the normal direction of travel, said roller being rotatable about a substantially horizontal axis.

18. A machine as claimed in claim 17, wherein the periphery of said roller is comprised by a plurality of elongate elements that extends in the same general direction as the axis of rotation of the roller.

19. A machine as claimed in claim 18, wherein adjusting means interconnects said roller with said frame and said roller can be retained at any one of a plurality of different levels relative to said cultivating member.

20. A soil cultivating machine comprising a frame and a cultivating member rotatably supported on said frame, driving means connected to said member to rotate same about a first axis during operation and said first axis extending horizontally transverse to the normal direction of travel of the machine, a plurality of tined soil working means journalled on a support shaft that defines said first axis of rotation, said soil working means being mounted in offsetting pairs around said shaft and each soil working means having a group of tines that extends away from said shaft, said plurality of soil working means being freely rotatable about corresponding axes of rotation than non-perpendicularly intersect said first axis.

* * * * *